(12) United States Patent
Espinoza

(10) Patent No.: US 12,110,219 B2
(45) Date of Patent: Oct. 8, 2024

(54) ALL-TERRAIN VEHICLE JACK

(71) Applicant: Vicente Espinoza, Surprise, AZ (US)

(72) Inventor: Vicente Espinoza, Surprise, AZ (US)

( * ) Notice: Subject to any disclaimer, the term of this patent is extended or adjusted under 35 U.S.C. 154(b) by 231 days.

(21) Appl. No.: 17/840,058

(22) Filed: Jun. 14, 2022

(65) Prior Publication Data
US 2023/0399210 A1 Dec. 14, 2023

(51) Int. Cl.
*B60S 9/08* (2006.01)
*B66F 3/08* (2006.01)
*B66F 3/10* (2006.01)

(52) U.S. Cl.
CPC . *B66F 3/10* (2013.01); *B60S 9/08* (2013.01)

(58) Field of Classification Search
CPC ........ B66F 13/00; B66F 2700/04; B66F 3/10; B66F 3/08; B60S 9/08
See application file for complete search history.

(56) References Cited

U.S. PATENT DOCUMENTS

| | | | | |
|---|---|---|---|---|
| 2,708,374 A * | 5/1955 | Engh | ......................... | B66F 3/08 74/89.44 |
| 4,093,181 A | 6/1978 | Ivins | | |
| D317,520 S | 6/1991 | Celette | | |
| 5,282,605 A * | 2/1994 | Sauber | ................... | B60D 1/665 254/420 |
| 5,897,121 A | 4/1999 | Case | | |
| 6,895,648 B1 | 5/2005 | Willett | | |
| 8,944,467 B1 * | 2/2015 | Dill | .......................... | B60S 9/08 280/766.1 |
| 9,776,840 B2 | 10/2017 | Jones | | |
| 10,343,654 B2 * | 7/2019 | Evans | ........................ | B66F 3/44 |
| 11,584,624 B1 * | 2/2023 | Christensen | .............. | B66F 3/44 |
| 2007/0251018 A1 | 11/2007 | Razzaghi | | |
| 2014/0231732 A1 | 8/2014 | Piuian | | |
| 2014/0246637 A1 * | 9/2014 | Anderson | ................. | B60S 9/18 254/425 |
| 2015/0197127 A1 * | 7/2015 | Magestro | .................. | B60S 9/18 173/217 |
| 2016/0038240 A1 * | 2/2016 | Guerrero | ................... | B66F 3/00 254/133 R |
| 2016/0229244 A1 * | 8/2016 | Drake | ...................... | B60D 1/66 |
| 2018/0264901 A1 * | 9/2018 | Downs | ..................... | B60D 1/46 |

FOREIGN PATENT DOCUMENTS

WO    WO9416926    8/1994

OTHER PUBLICATIONS

AGM Product Catalog (Year: 2017).*
The Electric Jack AGM Products (Year: 2020).*

* cited by examiner

*Primary Examiner* — Mahdi H Nejad

(57) ABSTRACT

An all-terrain vehicle jack for lifting and all-terrain vehicle wheel off the ground to service it in the field with portable equipment includes an inner tube coupled to a base positionable on a support surface with an outer tube telescopically coupled to the inner tube. A rod is rotationally coupled to the outer tube about a fixed point on the rod and is operationally coupled to the inner tube via a threaded coupling such that rotation of the rod translates the outer tube telescopically relative to the inner tube. A socket adapter is coupled to the rod to facilitate rotation of the rod by an impact driver. An arm configured to abut a lower surface of an all-terrain vehicle control arm is removably couplable at various positions to the outer tube.

10 Claims, 5 Drawing Sheets

ALL-TERRAIN VEHICLE JACK

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to all-terrain vehicle jacks and more particularly pertains to a new all-terrain vehicle jack for lifting an all-terrain vehicle wheel off the ground to service it in the field with portable equipment.

(2) Description of Related Art Including Information Disclosed Under 37 CFR 1.97 and 1.98

The prior art relates primarily to portable jacks adapted for use with passenger vehicles traveling on roads. Some devices disclosed in the prior art disclose pneumatic or hydraulic means of lifting the vehicle's tire using a lift permanently mounted to the vehicle. One device uses the electrical system of a vehicle to operate an automatic jack. There are known devices in the prior are which adapt existing vehicle jacks to be drill-powered, but these existing jacks are not configured for all-terrain vehicles. There is also a portable all-terrain vehicle jack which requires the all-terrain vehicle to leverage itself onto the jack so that a control arm of the all-terrain vehicle lies on the jack and the jack balances in an upright position. However, the prior art does not disclose an impact driver-powered jack with an engagement member configured to lift all-terrain vehicle control arms of different heights. Such a device is desirable because it provides a fast, portable method of lifting an all-terrain vehicle wheel for servicing. An impact driver is likely needed or helpful to remove an all-terrain vehicle wheel, so its use to power the jack synergizes well.

(h) BRIEF SUMMARY OF THE INVENTION

An embodiment of the disclosure meets the needs presented above by generally comprising an inner tube coupled to a base positionable on a support surface with an outer tube telescopically coupled to the inner tube. A rod is rotationally coupled to the outer tube about a fixed point on the rod and is operationally coupled to the inner tube via a threaded coupling such that rotation of the rod translates the outer tube telescopically relative to the inner tube. A socket adapter is coupled to the rod to facilitate rotation of the rod by an impact driver. An arm configured to abut a lower surface of an all-terrain vehicle control arm is removably couplable at various positions to the outer tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
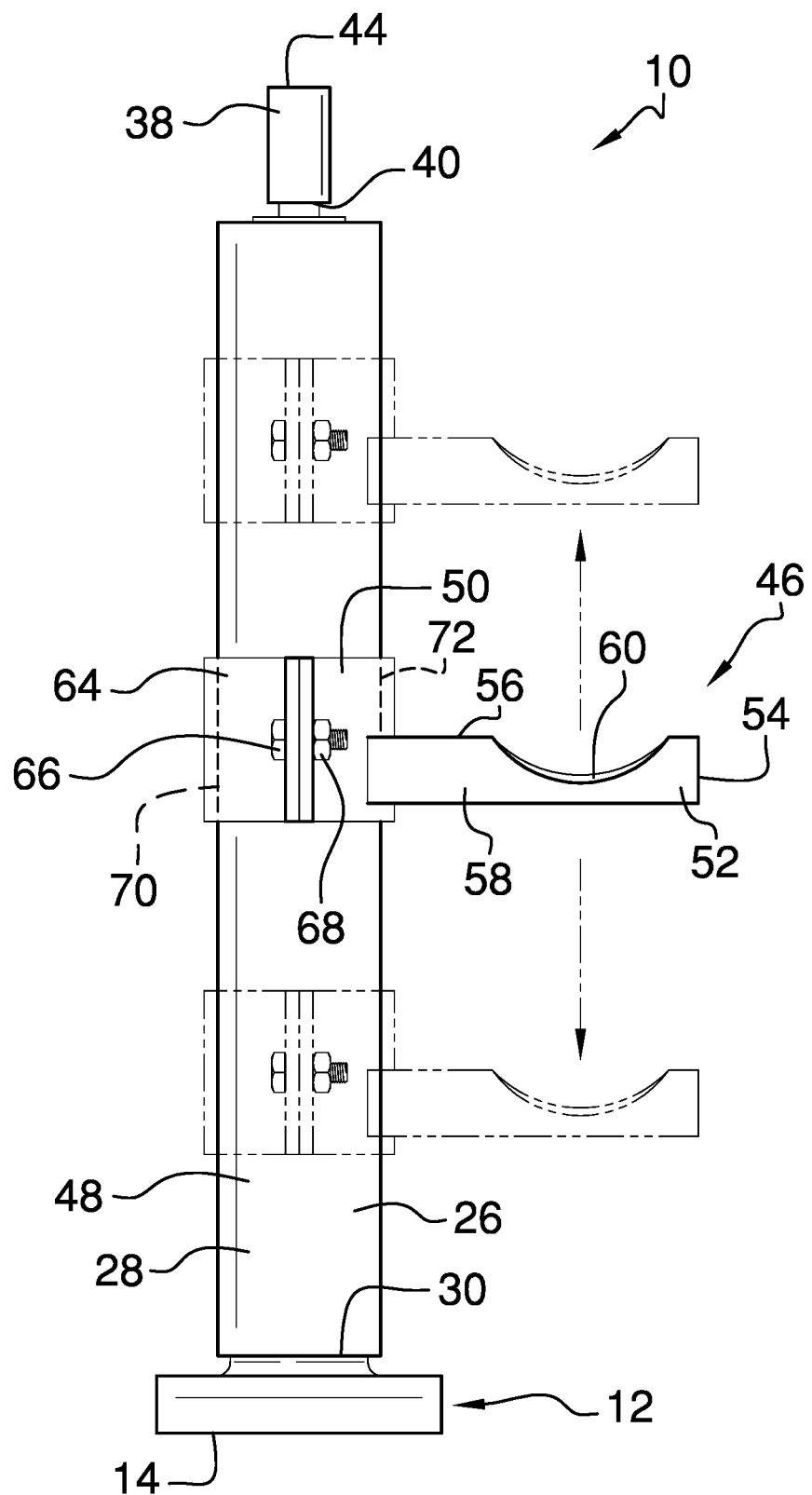
FIG. 1 is a side view of an all-terrain vehicle jack according to an embodiment of the disclosure.
Figure 2:
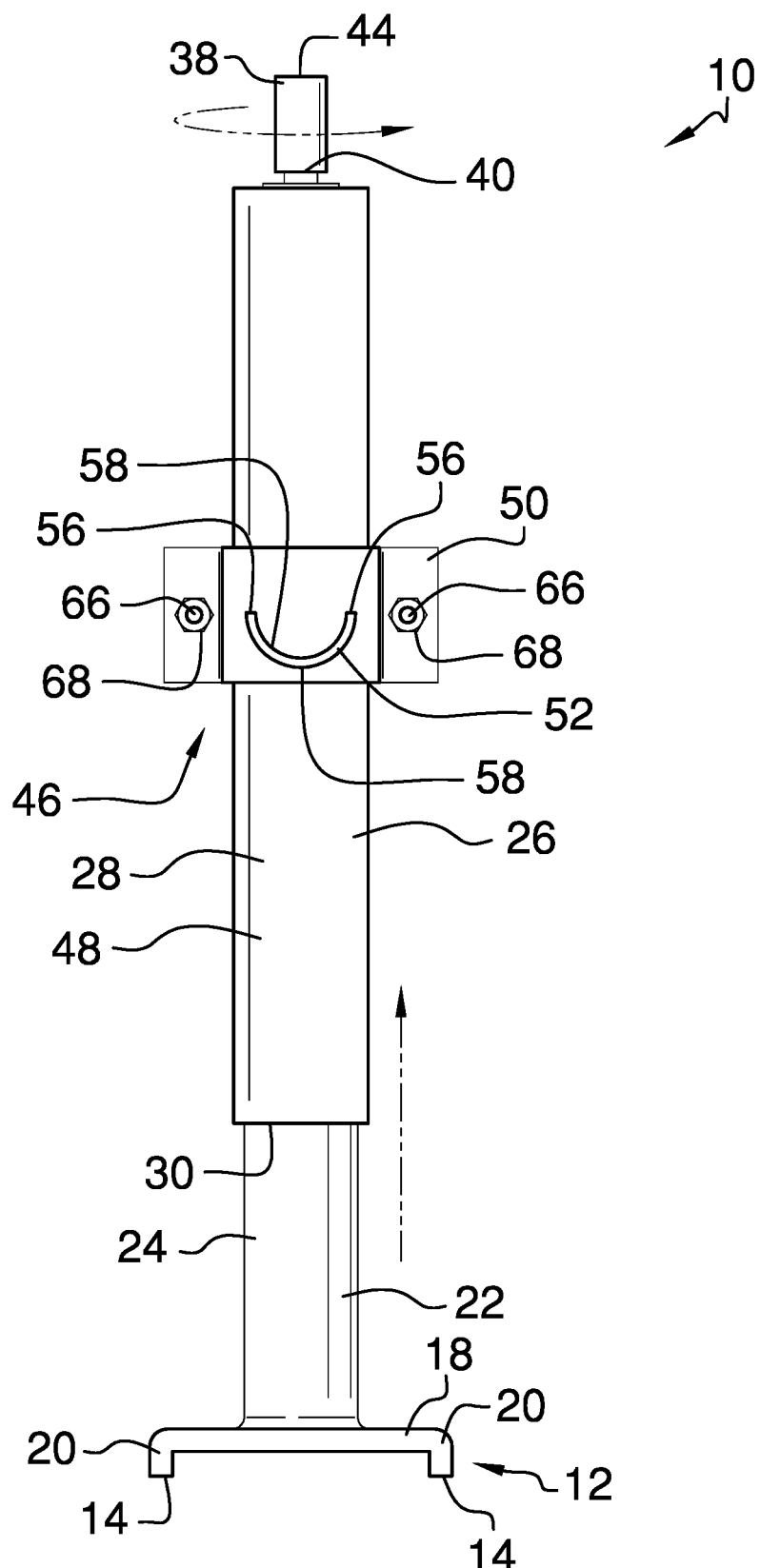
FIG. 2 is a front view of an embodiment of the disclosure.
Figure 3:
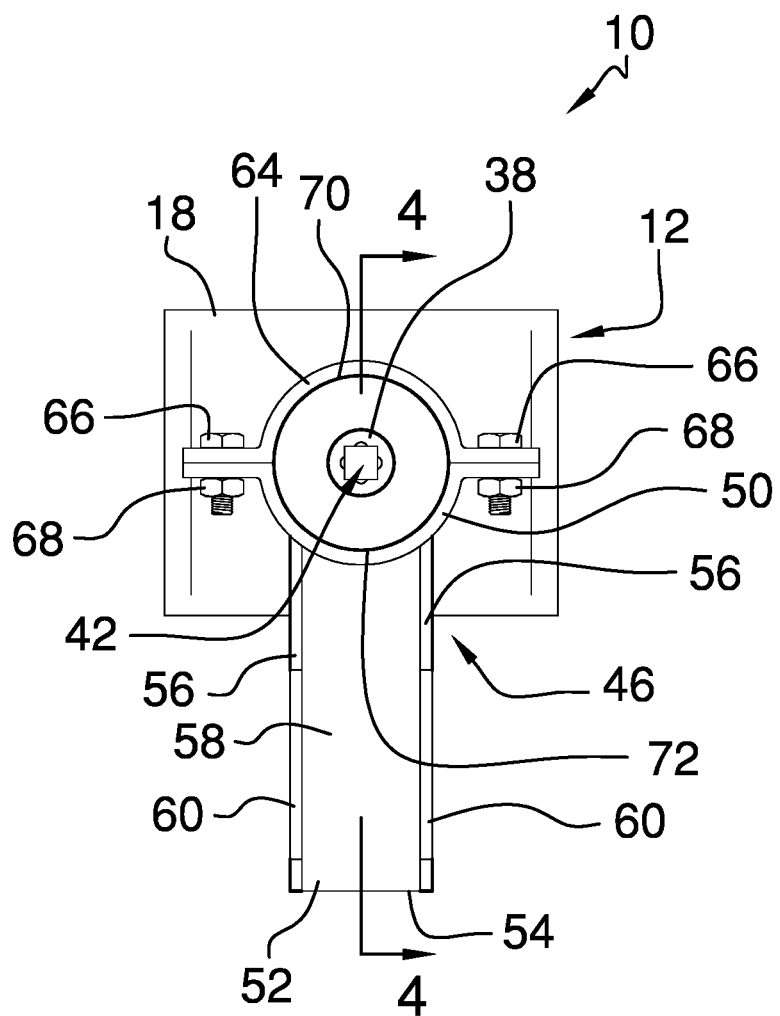
FIG. 3 is a top view of an embodiment of the disclosure.
Figure 4:
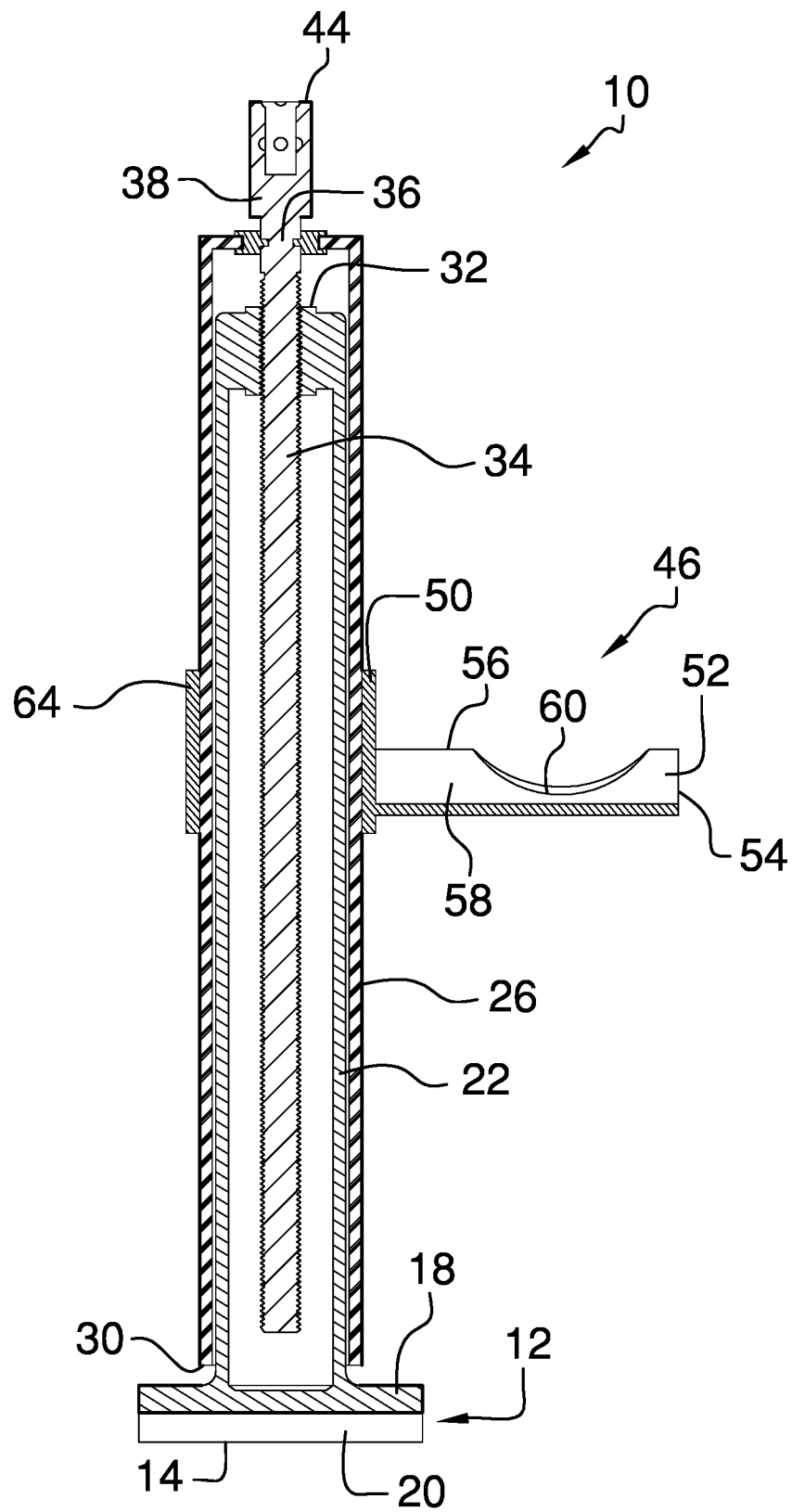
FIG. 4 is a cross-sectional side view of an embodiment of the disclosure.
Figure 5:
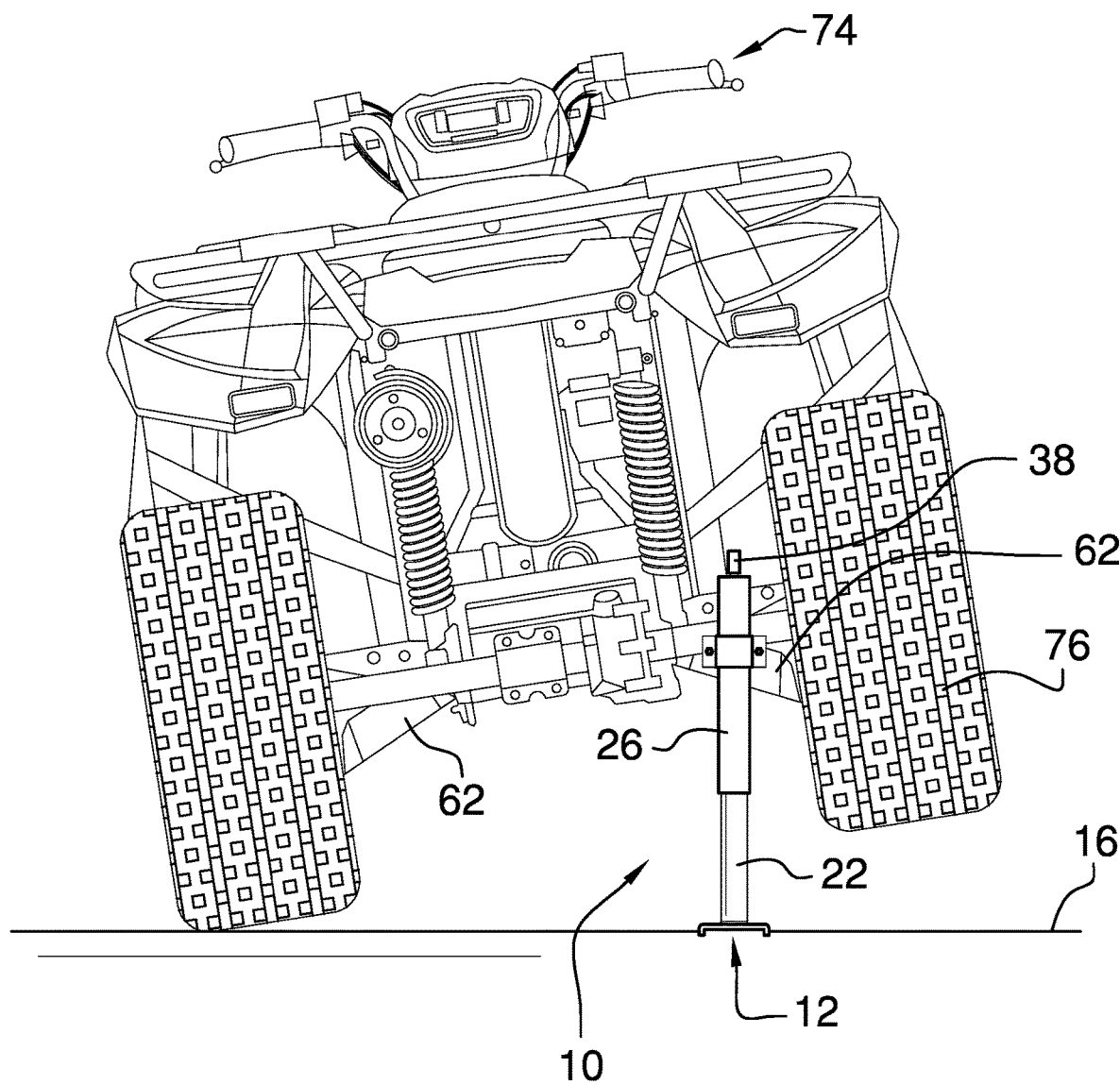
FIG. 5 is an in-use view of an embodiment of the disclosure.

With reference now to the drawings, and in particular to FIGS. 1 through 5 thereof, a new all-terrain vehicle jack embodying the principles and concepts of an embodiment of the disclosure and generally designated by the reference numeral 10 will be described.

As best illustrated in FIGS. 1 through 5, the all-terrain vehicle jack 10 generally comprises a base 12, wherein a first end 14 of the base 12 is configured to be movably positionable on a support surface 16. The base 12 comprises a planar central member 18 extending between a pair of extending members 20. The pair of extending members 20 extend perpendicular to the central member 18 from the central member 18 to the first end 14 of the base 12. The central member 18 of the base 12 has a length between 10.9 and 12.9 centimeters and a width between 8.4 and 9.4 centimeters.

An inner tube 22 is coupled to the central member 18 of the base 12 opposite the first end 14 of the base 12 and is centered on the central member 18 of the base 12. The inner tube 22 extends perpendicularly away from the base 12 along a first central longitudinal axis. The inner tube 22 is a hollow cylinder with an outer diameter 24 between 4.8 centimeters and 5.0 centimeters. An outer tube 26 is elongated along the first central longitudinal axis and telescopically coupled to the inner tube 22. The outer tube 26 is a hollow cylinder which receives the inner tube 22 therethrough and has an outer diameter 28 between 4.9 centimeters and 5.1 centimeters. The outer tube 26 is moveable between a contracted position and an extended position, wherein an end 30 of the outer tube 26 is proximate to the base 12 when the outer tube 26 is in the contracted position and the end 30 of the outer tube 26 is proximate to a distal end 32 of the inner tube 22 relative to the base 12 when the outer tube 26 is in the extended position.

A rod 34 is elongated along the first central longitudinal axis and is rotationally connected to the outer tube 26 at a fixed position 36 on the rod 34. The rod 34 has an externally threaded section complementary in shape to an internally threaded section of the inner tube 22. The rod 34 is operationally coupled to the inner tube 22 such that the outer tube 26 translates telescopically away from the base 12 when the rod 34 is rotated about the first central longitudinal axis a first rotational direction. And the outer tube 26 translates telescopically toward the base 12 when the rod 34 is rotated about the first central longitudinal axis a second rotational direction opposite the first rotational direction.

A socket adapter 38 is coupled to a distal end 40 of the rod 34 relative to the base 12 which is configured to operationally couple to an impact driver such that the impact driver rotates the socket adapter 38 and the rod 34 about the first central longitudinal axis. The socket adapter 38 is a female socket adapter 38 having a 1.27-centimeter square hole 42. The socket adapter 38 has a length from the rod 34 to a distal end 44 of the socket adapter 38 relative to the rod 34 between 3.3 centimeters and 4.3 centimeters. The distal end 44 of the socket adapter 38 is between 40.0 centimeters and 50.0 centimeters from the first end 14 of the base 12 when the outer tube 26 is in the contracted position and between 68.0 centimeters and 78.0 centimeters from the first end 14 of the base 12 when the outer tube 26 is in the extended position.

An arm 46 is removably couplable to the outer tube 26 and movably positionable along a cylindrical outer surface 48 of the outer tube 26. The arm 46 has a bracket section 50 and a protruding section 52. When coupled to the outer tube 26, the protruding section 52 of the arm 46 extends laterally from the outer tube 26 along a second central longitudinal axis from the bracket section 50 of the arm 46 to a distal end 54 of the protruding section 52 relative to the bracket section 50. The protruding section 52 has a shape of a half-pipe wherein each of a pair of planar edges 56 extend between each of a pair of arcuate surfaces 58. The second central longitudinal axis and each planar edge 56 are perpendicular with the first central longitudinal axis when the arm 46 is coupled to the outer tube 26. The protruding section 52 has an outer radius between 2.5 centimeters and 3.5 centimeters and a length between the bracket section 50 and the distal end 54 of the protruding section 52 between 4.0 centimeters and 5.0 centimeters. The protruding section 52 also has a pair of arcuate divots 60, each divot 60 penetrating each planar edge 56. Each divot 60 extends along a third central longitudinal axis perpendicular to the second central longitudinal axis. The protruding section 52 is configured to abut a lower surface of an all-terrain vehicle control arm 62.

A coupling bracket 64 has a pair of holes positionable adjacent a pair of holes of the bracket section 50 of the arm 46 such that a pair of bolts 66 and a pair of nuts 68 are able to cooperatively secure the coupling bracket 64 to the bracket section 50 of the arm 46. The pair of bolts 66 and the pair of nuts 68 cooperatively compress the coupling bracket 64 and the bracket section 50 of the arm 46 such that the coupling bracket 64 and the bracket section 50 of the arm 46 securely clamp to the outer tube 26 when the outer tube 26 is positioned between the coupling bracket 64 and the bracket section 50. An arcuate surface 70 of the coupling bracket 64 and an arcuate surface 72 of the bracket section 50 of the arm 46 abut the cylindrical outer surface 48 of the outer tube 26 when the coupling bracket 64 and the bracket section 50 of the arm 46 clamp to the outer tube 26.

In use, the all-terrain vehicle jack 10 is positioned with the first end 14 of the base 12 on a support surface 16 beneath the all-terrain vehicle 74, and the protruding section 52 of the arm 46 is positioned on the outer tube 26 at a height below a control arm 62 of the all-terrain vehicle 74, but high enough to lift the control arm 62 when the outer tube 26 is in the extended position. The driving element of an impact driver is inserted into the socket adapter 38 and is made to rotate the rod 34 in the first rotational direction, thereby telescopically translating the outer tube 26 and the arm 46 upward away from the base 12. This continues until the control arm 62 is engaged by the arm 46 and raised such that the all-terrain vehicle wheel 76 attached to the control arm 62 is serviceable. After the required service is performed on the all-terrain vehicle wheel 76, the impact driver is made to rotate the rod 34 in the second rotational direction, thereby translating the outer tube 26 and the arm 46 downward toward the base 12. In so doing, the all-terrain vehicle wheel 76 is set back down, and the control arm 62 is released by the arm 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An all-terrain vehicle jack comprising:
   a base, a first end of said base being configured to be movably positionable on a support surface;
   an inner tube, said inner tube being coupled to said base opposite said first end of said base, said inner tube being centered on said base, said inner tube extending perpendicularly away from said base along a first central longitudinal axis, said inner tube being a hollow cylinder;
   an outer tube elongated along said first central longitudinal axis and telescopically coupled to said inner tube, said outer tube being a hollow cylinder which receives said inner tube therethrough;
      wherein said outer tube is moveable between a contracted position and an extended position, wherein an end of said outer tube is proximate to said base when said outer tube is in said contracted position, wherein said end of said outer tube is proximate to a distal end of said inner tube relative to said base when said outer tube is in said extended position;

a rod elongated along said first central longitudinal axis, said rod being rotationally connected to said outer tube at a fixed position on said rod, said rod having an externally threaded section complementary in shape to an internally threaded section of said inner tube, said rod being operationally coupled to said inner tube such that said outer tube translates telescopically away from said base when said rod is rotated about said first central longitudinal axis a first rotational direction and said outer tube translates telescopically toward said base when said rod is rotated about said first central longitudinal axis a second rotational direction opposite said first rotational direction;

a socket adapter coupled to a distal end of said rod relative to said base, said socket adapter being configured to operationally couple to an impact driver such that the impact driver rotates said socket adapter and said rod about said first central longitudinal axis;

an arm removably couplable to said outer tube, said arm being movably positionable along a cylindrical outer surface of said outer tube, said arm extending laterally from said outer tube when coupled to said outer tube, said arm being configured to abut a lower surface of an all-terrain vehicle control arm, wherein said arm has a protruding section extending along a second central longitudinal axis from said bracket section of said arm to a distal end of said protruding section relative to said bracket section of said arm, said protruding section having a shape of a half-pipe wherein each of a pair of planar edges extend between each of a pair of arcuate surfaces, each said planar edge being perpendicular with said first central longitudinal axis when said arm is coupled to said outer tube, said second central longitudinal axis being perpendicular to said first central longitudinal axis when said arm is coupled to said outer tube, wherein said protruding section has a pair of arcuate divots, each said divot penetrating each planar edge, each said divot extending along a third central longitudinal axis perpendicular to said second central longitudinal axis; and a coupling bracket removably couplable to said arm, wherein said coupling bracket having a pair of holes positionable adjacent a pair of holes of a bracket section of said arm such that a pair of bolts and a pair of nuts are able to cooperatively secure said coupling bracket to said bracket section of said arm, said pair of bolts and said pair of nuts cooperatively compressing said coupling bracket and said bracket section of said arm such that said coupling bracket and said bracket section of said arm securely clamp to said outer tube when said outer tube is positioned between said coupling bracket and said bracket section.

2. The device of claim 1, wherein an arcuate surface of said coupling bracket abuts a cylindrical outer surface of said outer tube when said coupling bracket and said bracket section of said arm clamp to said outer tube, wherein an arcuate surface of said bracket section of said arm abuts said cylindrical outer surface of said outer tube when said coupling bracket and said bracket section of said arm clamp to said outer tube.

3. The device of claim 1, wherein said protruding section has an outer radius between 2.5 centimeters and 3.5 centimeters and a length between said bracket section and said distal end of said protruding section between 4.0 centimeters and 5.0 centimeters.

4. The device of claim 1, wherein said socket adapter is a female socket adapter having a square hole, a length of a side of said square hole being 1.27 centimeters.

5. The device of claim 4, wherein said socket adapter has a length from said rod to a distal end of said socket adapter relative to said rod between 3.3 centimeters and 4.3 centimeters.

6. The device of claim 1, wherein said base comprises a central member extending between a pair of extending members, said central member being planar, said pair of extending members extending perpendicular to said central member from said central member to said first end of said base.

7. The device of claim 6, wherein said central member of said base has a length between 10.9 and 12.9 centimeters and a width between 8.4 and 9.4 centimeters.

8. The device of claim 1, wherein a distal end of said socket adapter relative to said rod is between 40.0 centimeters and 50.0 centimeters from said first end of said base when said outer tube is in said contracted position, wherein said distal end of said socket adapter is between 68.0 centimeters and 78.0 centimeters from said first end of said base when said outer tube is in said extended position.

9. The device of claim 8, wherein an outer diameter of said inner tube is between 4.8 centimeters and 5.0 centimeters, wherein an outer diameter of said outer tube is between 4.9 centimeters and 5.1 centimeters.

10. An all-terrain vehicle jack comprising:

a base, a first end of said base being configured to be movably positionable on a support surface, wherein said base comprises a central member extending between a pair of extending members, said central member being planar, said pair of extending members extending perpendicular to said central member from said central member to said first end of said base, wherein said central member of said base has a rectangular cross section through said first central longitudinal axis, said rectangular cross-section having a length between 10.9 and 12.9 centimeters and a width between 8.4 and 9.4 centimeters;

an inner tube, said inner tube being coupled to said central member of said base opposite said first end of said base, said inner tube being centered on said central member of said base, said inner tube extending perpendicularly away from said base along a first central longitudinal axis, wherein said inner tube is a hollow cylinder, wherein an outer diameter of said inner tube is between 4.8 centimeters and 5.0 centimeters;

an outer tube elongated along said first central longitudinal axis and telescopically coupled to said inner tube, said outer tube being a hollow cylinder which receives said inner tube therethrough, wherein an outer diameter of said outer tube is between 4.9 centimeters and 5.1 centimeters;

wherein said outer tube is moveable between a contracted position and an extended position, wherein an end of said outer tube is proximate to said base when said outer tube is in said contracted position, wherein said end of said outer tube is proximate to a distal end of said inner tube relative to said base when said outer tube is in said extended position;

a rod elongated along said first central longitudinal axis, said rod being rotationally connected to said outer tube at a fixed position on said rod, said rod having an externally threaded section complementary in shape to an internally threaded section of said inner tube, said rod being operationally coupled to said inner tube such that said outer tube translates telescopically away from said base when said rod is rotated about said first central longitudinal axis a first rotational direction and said outer tube translates telescopically toward said base when said rod is rotated about said first central longitudinal axis a second rotational direction opposite said first rotational direction;

a socket adapter coupled to a distal end of said rod relative to said base, said socket adapter being configured to operationally couple to an impact driver such that the impact driver rotates said socket adapter and said rod about said first central longitudinal axis,
  wherein said socket adapter is a female socket adapter having a square hole, a length of a side of said square hole being 1.27 centimeters,
  wherein said socket adapter has a length from said rod to a distal end of said socket adapter relative to said rod between 3.3 centimeters and 4.3 centimeters,
  wherein said distal end of said socket adapter is between 40.0 centimeters and 50.0 centimeters from said first end of said base when said outer tube is in said contracted position,
  wherein said distal end of said socket adapter is between 68.0 centimeters and 78.0 centimeters from said first end of said base when said outer tube is in said extended position;

an arm having a bracket section and a protruding section, said arm being removably couplable to said outer tube, said arm being movably positionable along a cylindrical outer surface of said outer tube, said protruding section of said arm extending laterally from said outer tube when coupled to said outer tube, said arm being configured to abut a lower surface of an all-terrain vehicle control arm,
  wherein said protruding section extends along a second central longitudinal axis from said bracket section of said arm to a distal end of said protruding section relative to said bracket section of said arm, said protruding section having a shape of a half-pipe wherein each of a pair of planar edges extend between each of a pair of arcuate surfaces, each said planar edge being perpendicular with said first central longitudinal axis when said arm is coupled to said outer tube, said second central longitudinal axis being perpendicular to said first central longitudinal axis when said arm is coupled to said outer tube,
  wherein said protruding section has an outer radius between 2.5 centimeters and 3.5 centimeters and a length between said bracket section and said distal end of said protruding section between 4.0 centimeters and 5.0 centimeters,
  wherein said protruding section has a pair of arcuate divots, each said divot penetrating each planar edge, each said divot extending along a third central longitudinal axis perpendicular to said second central longitudinal axis; and a coupling bracket removably couplable to said arm,
  wherein said coupling bracket has a pair of holes positionable adjacent a pair of holes of said bracket section of said arm such that a pair of bolts and a pair of nuts are able to cooperatively secure said coupling bracket to said bracket section of said arm, said pair of bolts and said pair of nuts cooperatively compressing said coupling bracket and said bracket section of said arm such that said coupling bracket and said bracket section of said arm securely clamp to said outer tube when said outer tube is positioned between said coupling bracket and said bracket section,
  wherein an arcuate surface of said coupling bracket abuts said cylindrical outer surface of said outer tube when said coupling bracket and said bracket section of said arm clamp to said outer tube,
  wherein an arcuate surface of said bracket section of said arm abuts said cylindrical outer surface of said outer tube when said coupling bracket and said bracket section of said arm clamp to said outer tube.

\* \* \* \* \*